US012771036B2

(12) United States Patent
Lin et al.

(10) Patent No.: US 12,771,036 B2
(45) Date of Patent: Oct. 20, 2026

(54) MAGNETO-ELECTRIC DIPOLE ANTENNA AND ANTENNA ARRAY

(71) Applicant: Alpha Networks Inc., Hsinchu (TW)

(72) Inventors: Pao-Wei Lin, Hsinchu (TW); Yao-Jen Chen, Hsinchu (TW)

(73) Assignee: ALPHA NETWORKS INC, Hsinchu (TW)

( * ) Notice: Subject to any disclaimer, the term of this patent is extended or adjusted under 35 U.S.C. 154(b) by 92 days.

(21) Appl. No.: 18/904,992

(22) Filed: Oct. 2, 2024

(65) Prior Publication Data

US 2025/0372876 A1 Dec. 4, 2025

(30) Foreign Application Priority Data

May 29, 2024 (TW) ................................ 113119801
Jun. 21, 2024 (TW) ................................ 113123203

(51) Int. Cl.
*H01Q 9/28* (2006.01)
*H01Q 21/06* (2006.01)
*H01Q 21/24* (2006.01)

(52) U.S. Cl.
CPC ........... *H01Q 9/285* (2013.01); *H01Q 21/062* (2013.01); *H01Q 21/24* (2013.01)

(58) Field of Classification Search
CPC ........ H01Q 9/285; H01Q 9/16; H01Q 19/108; H01Q 21/062
See application file for complete search history.

(56) References Cited

U.S. PATENT DOCUMENTS 11,901,638 B2 * 2/2024 Chainon ................ H01Q 9/285
11,909,120 B1 * 2/2024 Tianang ................. H01Q 21/26
(Continued)

FOREIGN PATENT DOCUMENTS

CN 110176667 B * 7/2021 ........... H01Q 15/242
CN 114498003 A * 5/2022 ........... H01Q 25/001
(Continued)

OTHER PUBLICATIONS

Search Report appended to an Office Action, which was issued to Taiwanese counterpart application No. 113123203 by the TIPO on Apr. 14, 2025, with an English translation thereof (2 pages).
(Continued)

*Primary Examiner* — Ab Salam Alkassim, Jr.
(74) *Attorney, Agent, or Firm* — HSML P.C.

(57) ABSTRACT

A magneto-electric dipole antenna includes a substrate module, a radiative element, a first feeding probe, a second feeding probe, a first feed-in line and a second feed-in line. The radiative element is disposed above the substrate module. The first feeding probe and the second feeding probe are disposed in the substrate module below the radiative element and extend from top to bottom. The first feed-in line and the second feed-in line are disposed below the substrate module, and are electrically connected to the first feed-in line and the second feed-in line respectively. When the radiative element receives an input electromagnetic wave, a portion of the input electromagnetic wave is sequentially and electromagnetically coupled to the first feeding probe and the first feed-in line, and another portion of the input electromagnetic wave is sequentially and electromagnetically coupled to the second feeding probe and the second feed-in line.

7 Claims, 11 Drawing Sheets

(56) References Cited

U.S. PATENT DOCUMENTS

| | | | | | |
|---|---|---|---|---|---|
| 12,548,914 | B2 * | 2/2026 | Tai | ......................... | H01Q 1/243 |
| 12,573,758 | B2 * | 3/2026 | Hassan | ................ | H01Q 9/0414 |
| 2022/0069475 | A1 * | 3/2022 | Patriotis | ............. | H01Q 21/0006 |
| 2022/0255230 | A1 * | 8/2022 | Liu | ...................... | H01Q 9/0414 |
| 2023/0016045 | A1 * | 1/2023 | Vu | ........................... | H01Q 9/28 |
| 2023/0070175 | A1 * | 3/2023 | Moallem | .............. | H01Q 9/0407 |
| 2023/0076013 | A1 * | 3/2023 | Moallem | ................ | H01Q 21/24 |
| 2024/0055776 | A1 * | 2/2024 | He | ..................... | H01Q 21/0075 |
| 2024/0222874 | A1 * | 7/2024 | Tai | ......................... | H01Q 1/243 |
| 2024/0396218 | A1 * | 11/2024 | Zhang | ...................... | H01Q 5/28 |
| 2025/0087906 | A1 * | 3/2025 | Tai | ....................... | H01Q 1/2283 |
| 2025/0167450 | A1 * | 5/2025 | Tai | ......................... | H01Q 21/08 |
| 2025/0273865 | A1 * | 8/2025 | Bai | ........................ | H01Q 9/285 |
| 2026/0024922 | A1 * | 1/2026 | Bai | .......................... | H01Q 9/28 |
| 2026/0094977 | A1 * | 4/2026 | Bai | .......................... | H01Q 9/28 |

FOREIGN PATENT DOCUMENTS

| | | | | | |
|---|---|---|---|---|---|
| CN | 114614273 | A | | 6/2022 | |
| CN | 116706515 | A | * | 9/2023 | ............... H01Q 1/36 |
| CN | 117293548 | A | * | 12/2023 | ............. H01Q 9/045 |
| CN | 117855849 | A | * | 4/2024 | ........... H01Q 21/062 |
| GB | 2517735 | A | * | 3/2015 | ............. H01Q 21/26 |
| KR | 102335213 | B1 | * | 12/2021 | ............... H01Q 1/38 |
| TW | 202240978 | A | | 10/2022 | |
| WO | 2022/012022 | A1 | | 1/2022 | |

OTHER PUBLICATIONS

Y. Li et al., “A Ka-Band Wideband Dual-Polarized Magnetoelectric Dipole Antenna Array on LTCC,” IEEE Transactions on Antennas and Propagation, 68(6), 2020, pp. 4985-4990.

* cited by examiner

MAGNETO-ELECTRIC DIPOLE ANTENNA AND ANTENNA ARRAY

CROSS-REFERENCE TO RELATED APPLICATION

This application claims priority to Taiwanese Invention Patent Application No. 113119801, filed on May 29, 2024, and Taiwanese Invention Patent Application No. 113123203, filed on Jun. 21, 2024, the entire disclosure of which is incorporated by reference herein.

FIELD

The disclosure relates to antenna technology, and more particularly to a magneto-electric dipole antenna and an antenna array.

BACKGROUND

A single-layer magneto-electric dipole antenna array disclosed in Chinese Patent Application Publication No. CN114614273A includes four magneto-electric dipole units that form a 2×2 array. Each of the magneto-electric dipole units includes a dielectric substrate, four square dipoles that are disposed on an upper surface of the dielectric substrate and that are arranged in a 2×2 array, a magneto-electric dipole that is disposed on the upper surface of the dielectric substrate and that is surrounded by the square dipoles, and a coaxial probe that extends downwardly from one end of the magneto-electric dipole into the dielectric substrate. Any adjacent two of the magneto-electric dipole units are connected by microstrip lines. For each of the magneto-electric dipole units, the one end of the magneto-electric dipole where the coaxial probe extends from acts as a feeding port of the magneto-electric dipole unit. By adjusting phases of input electromagnetic waves received by the magneto-electric dipole units, the antenna array can be freely switched between dual polarization and circular polarization functions, with a circular polarization axial ratio of less than 0.2 dB.

SUMMARY

Therefore, an object of the disclosure is to provide an alternative configuration of a magneto-electric dipole antenna and an antenna array.

According to an aspect of the disclosure, a magneto-electric dipole antenna includes a substrate module, a radiative element, a first feeding probe, a second feeding probe, a first feed-in line and a second feed-in line. The substrate module includes an upper surface and a lower surface. The radiative element is disposed on the upper surface of the substrate module. The first feeding probe and the second feeding probe are disposed in the substrate module and below the radiative element, where a length of the second feeding probe extending in a first direction pointing from top to bottom is greater than a length of the first feeding probe extending in the first direction. The first feed-in line and the second feed-in line are disposed on the lower surface of the substrate module. The first feeding probe is electrically connected to the first feed-in line, and the second feeding probe is electrically connected to the second feed-in line. In response to the radiative element receiving an input electromagnetic wave, a portion of the input electromagnetic wave is sequentially and electromagnetically coupled to the first feeding probe and the first feed-in line, and another portion of the input electromagnetic wave is sequentially and electromagnetically coupled to the second feeding probe and the second feed-in line.

According to another aspect of the disclosure, an antenna array includes a first antenna, a second antenna, a third antenna and a fourth antenna, each of which includes the magneto-electric dipole antenna as mentioned above. A center of the second antenna is aligned with a center of the first antenna in a second direction, and the second antenna is offset from the first antenna in a counterclockwise direction by 90 degrees. A center of the third antenna is aligned with the center of the second antenna in a third direction, and the third antenna is offset from the second antenna in the counterclockwise direction by 90 degrees. A center of the fourth antenna is aligned with the center of the third antenna in the second direction, and the fourth antenna is offset from the third antenna in the counterclockwise direction by 90 degrees.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
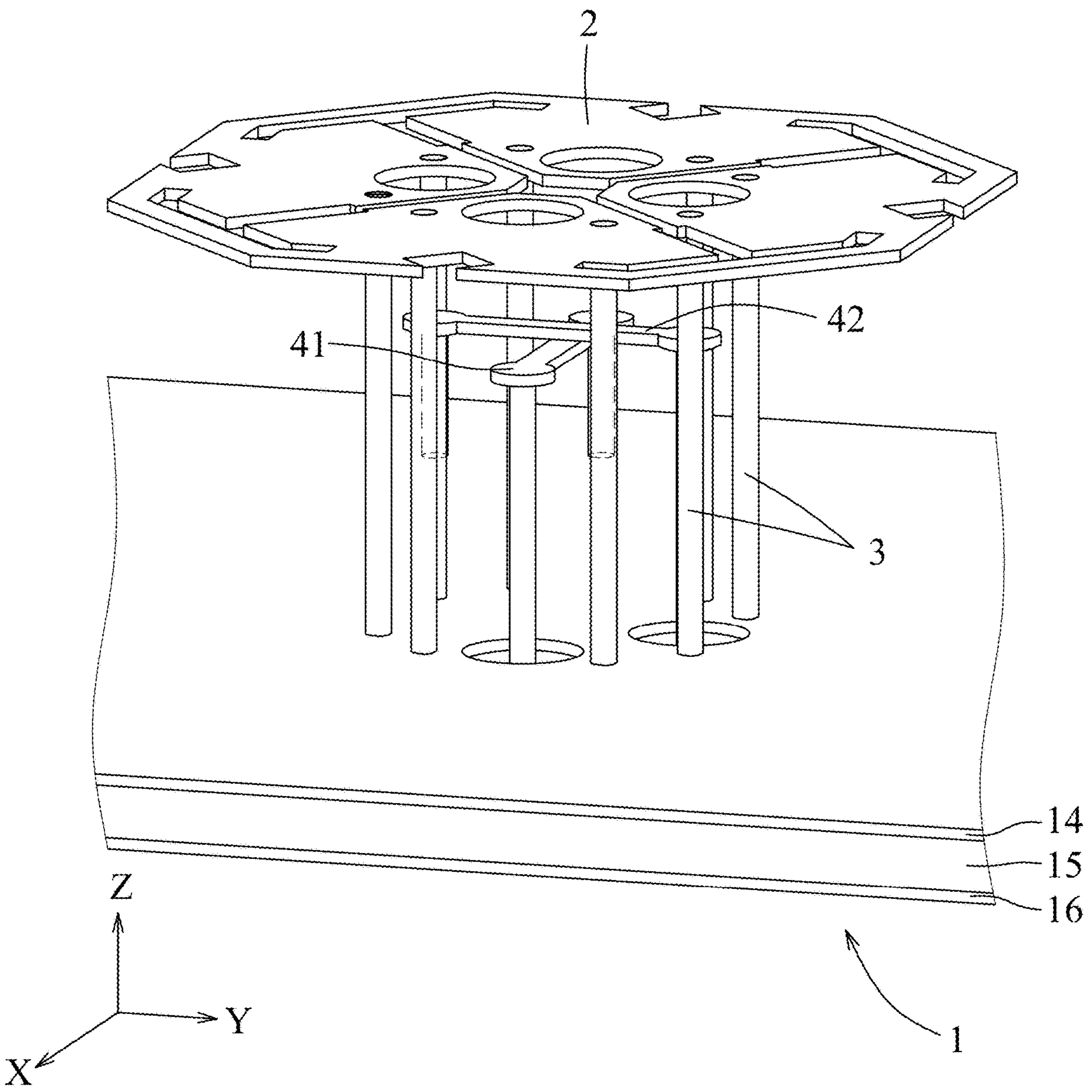
FIG. 1 is a fragmentary perspective view illustrating a magneto-electric dipole antenna according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 5, a magneto-electric dipole antenna according to an embodiment of the disclosure is adapted to receive an input electromagnetic wave. The magneto-electric dipole antenna includes a substrate module 1, a radiative element 2, eight conducting rods 3, a first feeding probe 41, a second feeding probe 42, a first feed-in line 51 and a second feed-in line 52.

The substrate module 1 has an upper surface and a lower surface, and includes a first substrate 11, a first adhesive layer 12, a second substrate 13, a ground layer 14, a second adhesive layer 15 and a third substrate 16 that are stacked in a first direction which points from top to bottom and which is reverse to a Z-direction. Centers of the first substrate 11, the first adhesive layer 12, the second substrate 13, the ground layer 14, the second adhesive layer 15 and the third substrate 16 are aligned in a line parallel to the first direction. Each of the first substrate 11, the first adhesive layer 12, the second substrate 13, the second adhesive layer 15 and the third substrate 16 is made of a dielectric material. The ground layer 14 is made of metal.

It should be noted that the first substrate 11, the first adhesive layer 12 and the second substrate 13 are omitted in FIG. 1 so that other components of the magneto-electric dipole antenna (e.g., the radiative element 2, the conducting rods 3, the first feeding probe 41 and the second feeding probe 42) may be clearly seen.

The radiative element 2 is a plate with a shape of a polygon, where a number of sides of the polygon is an integer greater than four. In this embodiment, the radiative element 2 is octagonal. The radiative element 2 serves as an electric dipole of the magneto-electric dipole antenna, and is disposed on the upper surface of the substrate module 1 (i.e., an upper surface of the first substrate 11). A center of the radiative element 2 and a center of the upper surface of the first substrate 11 are aligned in a line parallel to the first direction.

The radiative element 2 includes four main parts 211-214 and four connecting parts 221. The main parts 211-214 are arranged around the center of the upper surface of the first substrate 11. Any adjacent two of the main parts 211-214 are electrically connected to each other through one of the connecting parts 221. Each one of the main parts 211-214 is provided with a first hole 231 and a second hole 232, and has mirror symmetry about a line that passes through a center of the first hole 231 and a center of the second hole 232. The main parts 211-214 and the connecting parts 221 cooperatively form a separation slot 233 that has a shape of a cross, where a center portion of the separation slot 233 has a shape of a square.

The main parts 211-214 include a first main part 211, a second main part 212, a third main part 213 and a fourth main part 214 that are disposed separately from each other. The first main part 211 and the third main part 213 are disposed to have mirror symmetry about a line that passes through the center of the upper surface of the first substrate 11 along a second direction (X). The second main part 212 and the fourth main part 214 are disposed to have mirror symmetry about a line that passes through the center of the upper surface of the first substrate 11 along a third direction (Y). When viewing from top to bottom in the first direction, the second main part 212 is offset from the first main part 211 in a counterclockwise direction by 90 degrees, the third main part 213 is offset from the second main part 212 in the counterclockwise direction by 90 degrees, and the fourth main part 214 is offset from the third main part 213 in the counterclockwise direction by 90 degrees.

It should be noted that the first direction, the second direction (X) and the third direction (Y) are perpendicular to each other.

The eight conducting rods 3 are arranged around a line that passes a center of the main parts 211-214 along the first direction, and are divided into four pairs corresponding respectively to the four main parts 211-214. Each pair of the conducting rods 3 extend from a lower surface of the corresponding one of the four main parts 211-214 in the first direction and penetrate the substrate module 1. Each of the conducting rods 3 is made of metal, and serves as a magnetic dipole of the magneto-electric dipole antenna.

The first feeding probe 41 and the second feeding probe 42 are disposed in the substrate module 1 and below the radiative element 2, where a length of the second feeding probe 42 extending in the first direction is greater than a length of the first feeding probe 41 extending in the first direction.

The first feeding probe 41 includes a first connecting component 411 that is disposed in the substrate module 1 on an upper surface of the second substrate 13 (i.e., being embedded in the first adhesive layer 12), and that has a first primary end 412 and a first auxiliary end 413 which are opposite to each other and are aligned in a line parallel to the second direction (X). The first feeding probe 41 further includes a first primary rod 414 that extends in the first direction from the first primary end 412, and that penetrates the second substrate 13, the ground layer 14, the second adhesive layer 15 and the third substrate 16 (i.e., the first primary rod 414 extends to a first plane flushing with the lower surface of the substrate module 1). The first feeding probe 41 further includes a first auxiliary rod 415 that extends in the first direction from the first auxiliary end 413, and that penetrates the second substrate 13 (i.e., the first auxiliary rod 415 extends to a second plane higher than the lower surface of the substrate module 1). That is to say, a length of the first auxiliary rod 415 is shorter than a length of the first primary rod 414.

The second feeding probe 42 includes a second connecting component 421 that is disposed in the substrate module 1 on a lower surface of the first substrate 11 (i.e., being embedded in the first adhesive layer 12), and that has a second primary end 422 and a second auxiliary end 423 which are opposite to each other and are aligned in a line parallel to the third direction (Y). The second feeding probe 42 further includes a second primary rod 424 that extends in the first direction from the second primary end 422, and that penetrates the first adhesive layer 12, the second substrate 13, the ground layer 14, the second adhesive layer 15 and the third substrate 16 (i.e., the second primary rod 424 extends to the first plane flush with the lower surface of the substrate module 1). The second feeding probe 42 further includes a second auxiliary rod 425 that extends in the first direction from the second auxiliary end 423, and that penetrates the first adhesive layer 12 and the second substrate 13 (i.e., the second auxiliary rod 425 extends to a third plane higher than the lower surface of the substrate module 1). That is to say, a length of the second auxiliary rod 425 is shorter than a length of the second primary rod 424.

The first primary rod 414 is entirely within a projection of the first hole 231 of the first main part 211 in the first direction. Specifically, a center axis of the first primary rod 414 and the center of the first hole 231 of the first main part 211 are aligned in the first direction. The second primary rod 424 is entirely within a projection of the first hole 231 of the second main part 212 in the first direction. Specifically, a center axis of the second primary rod 424 and the center of the first hole 231 of the second main part 212 are aligned in the first direction. The first auxiliary rod 415 is entirely within a projection of the first hole 231 of the third main part 213 in the first direction. Specifically, a center axis of the first auxiliary rod 415 and the center of the first hole 231 of the third main part 213 are aligned in the first direction. The second auxiliary rod 425 is entirely within a projection of the first hole 231 of the fourth main part 214 in the first direction. Specifically, a center axis of the second auxiliary rod 425 and the center of the first hole 231 of the fourth main part 214 are aligned in the first direction.

The second connecting component 421 is closer to the radiative element 2 than the first connecting component 411. The length of the second primary rod 424 is greater than the length of the first primary rod 414. A center of the first connecting component 411, a center of the second connecting component 421 and a center of the upper surface of the substrate module 1 are aligned in a line parallel to the first direction, and the first feeding probe 41 and the second feeding probe 42 are spaced apart from each other.

Figure 2:
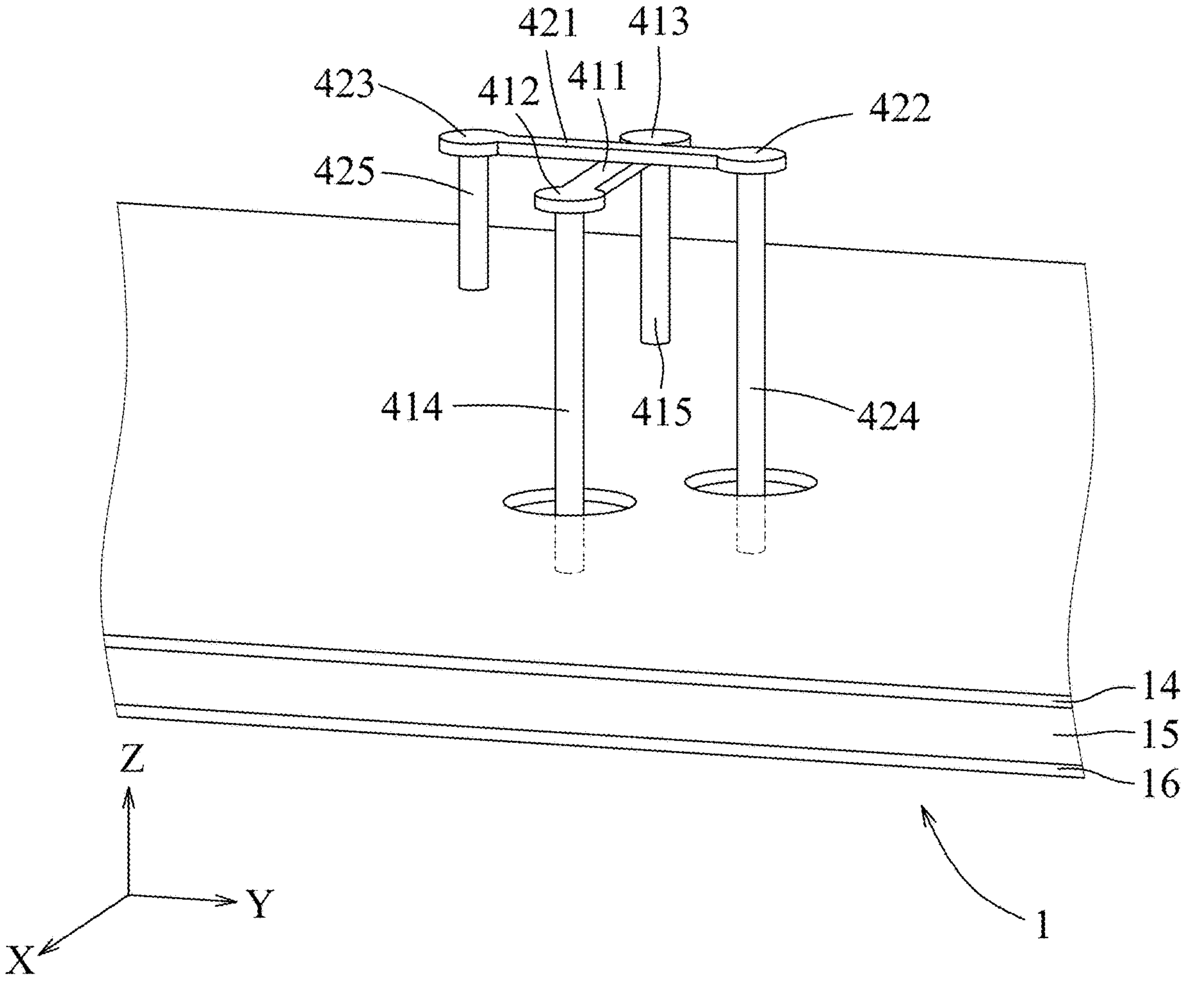
FIG. 2 is another fragmentary perspective view illustrating the magneto-electric dipole antenna according to the embodiment of the disclosure.

It should be noted that the first substrate 11, the first adhesive layer 12, the second substrate 13, the radiative element 2 and the conducting rods 3 are omitted in FIG. 2 so that other components of the magneto-electric dipole antenna (e.g., the first feeding probe 41 and the second feeding probe 42) may be clearly seen.

The first feed-in line 51 is disposed on a lower surface of the third substrate 16 (i.e., the lower surface of the substrate module 1) and is electrically connected to the first feeding probe 41. The first feed-in line 51 extends, in the second direction (X), from an end portion of the first primary rod 414 that is close to the lower surface of the third substrate 16 away from the first auxiliary rod 415, and before extending beyond a projection of the radiative element 2 in the first direction, the first feed-in line 51 turns to extend in the third direction (Y).

The second feed-in line 52 is disposed on the lower surface of the third substrate 16, is electrically connected to the second feeding probe 42, and extends, in the third direction (Y), from an end portion of the second primary rod 424 that is close to the lower surface of the third substrate 16 away from the second auxiliary rod 425.

When the radiative element 2 receives the input electromagnetic wave, a portion of the input electromagnetic wave is sequentially and electromagnetically coupled to the first feeding probe 41 and the first feed-in line 51, and another portion of the input electromagnetic wave is sequentially and electromagnetically coupled to the second feeding probe 42 and the second feed-in line 52.

In this embodiment, the magneto-electric dipole antenna is configured to operate in a frequency band from 17.7 GHz to 21.2 GHz (i.e., an operating frequency band of the magneto-electric dipole antenna is from 17.7 GHz to 21.2 GHz), and can be used in a low-earth orbit satellite communication system.

Figure 3:
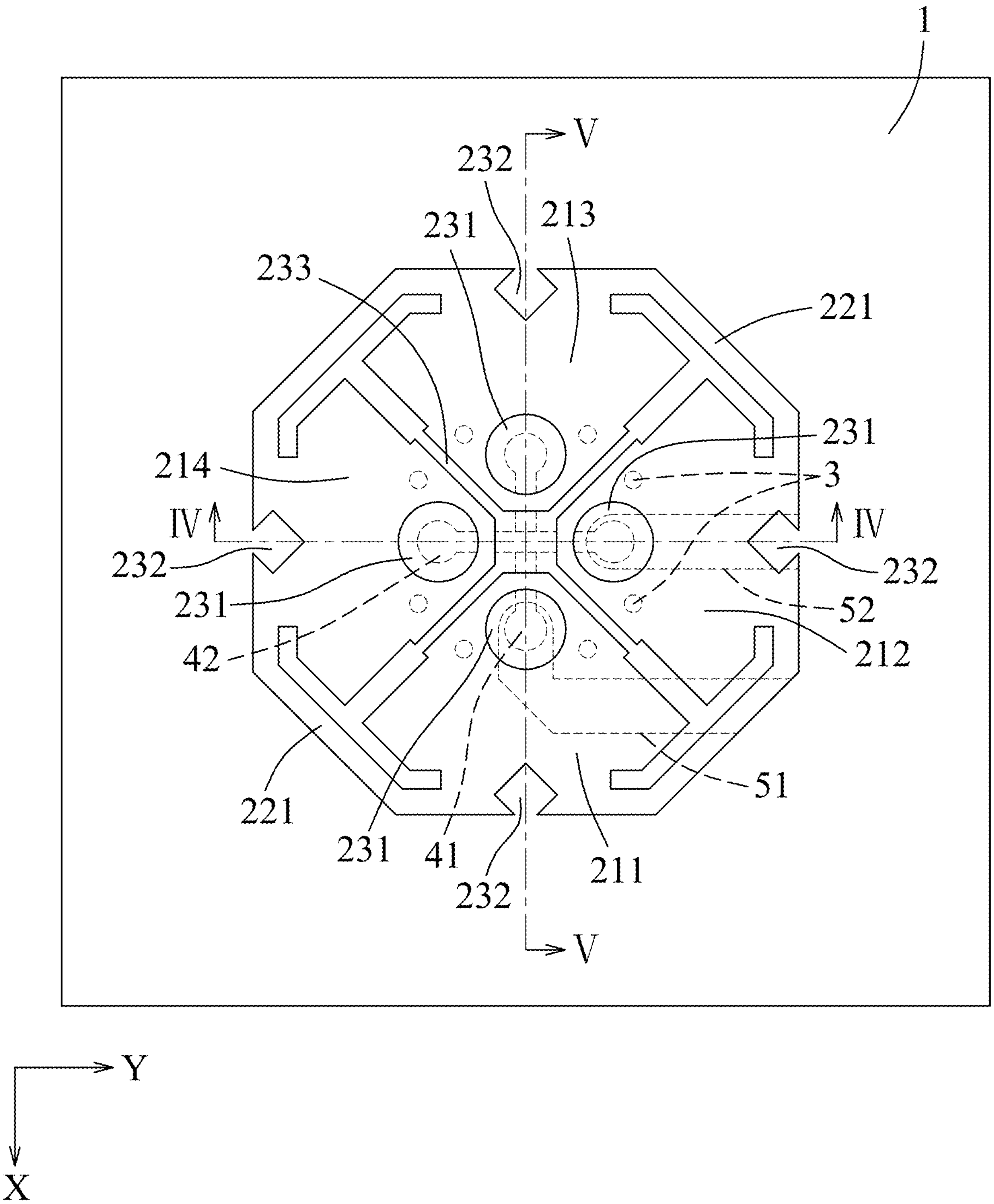
FIG. 3 is a top view illustrating the magneto-electric dipole antenna according to the embodiment of the disclosure.
Figure 4:
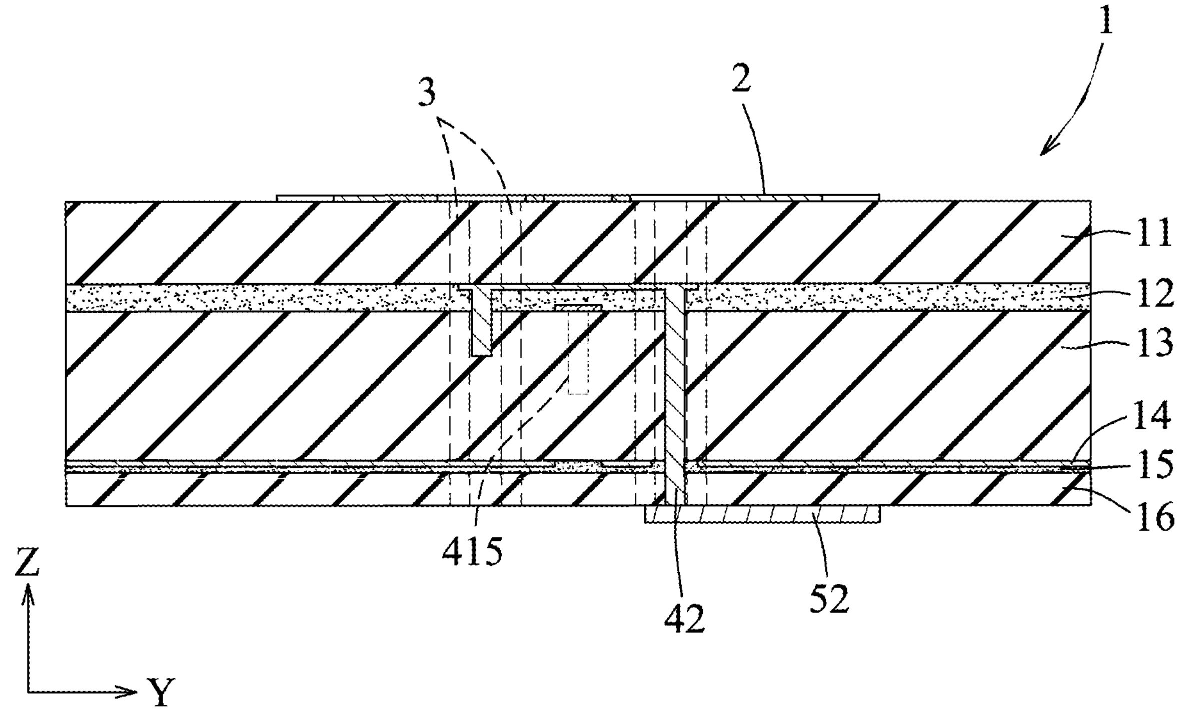
FIG. 4 is a sectional view taken along line IV-IV in FIG. 3, illustrating the magneto-electric dipole antenna according to the embodiment.
Figure 5:
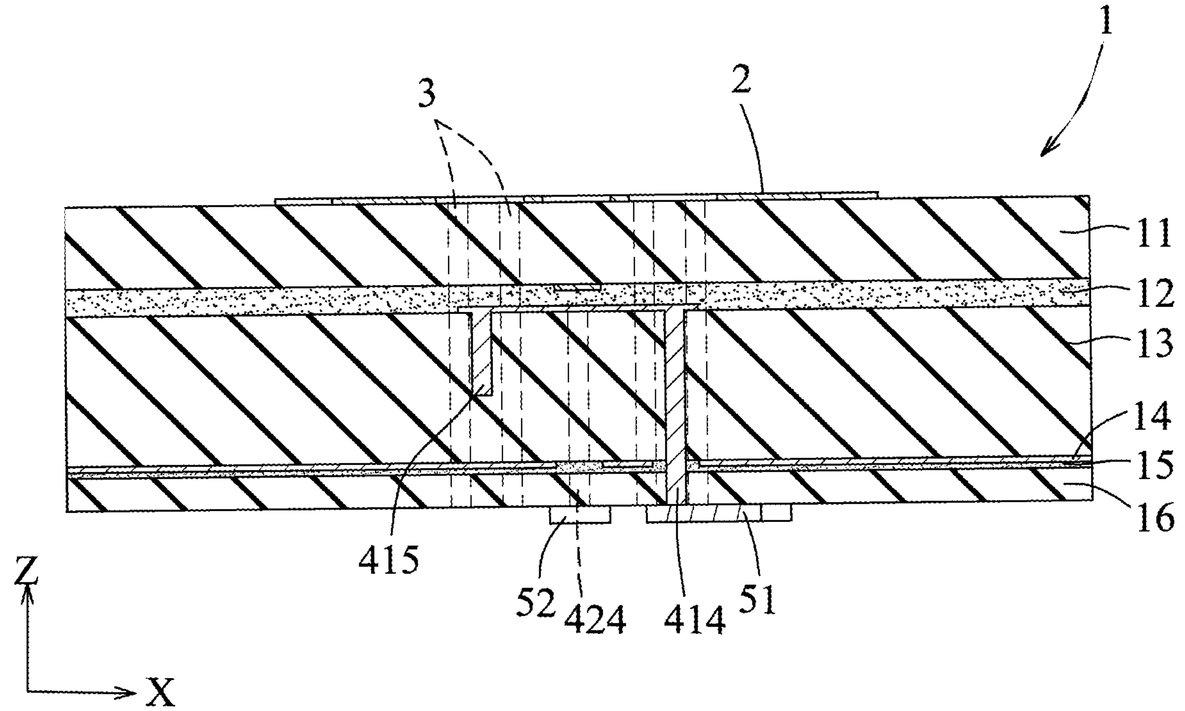
FIG. 5 is a sectional view taken along line V-V in FIG. 3, illustrating the magneto-electric dipole antenna according to the embodiment.
Figure 6:
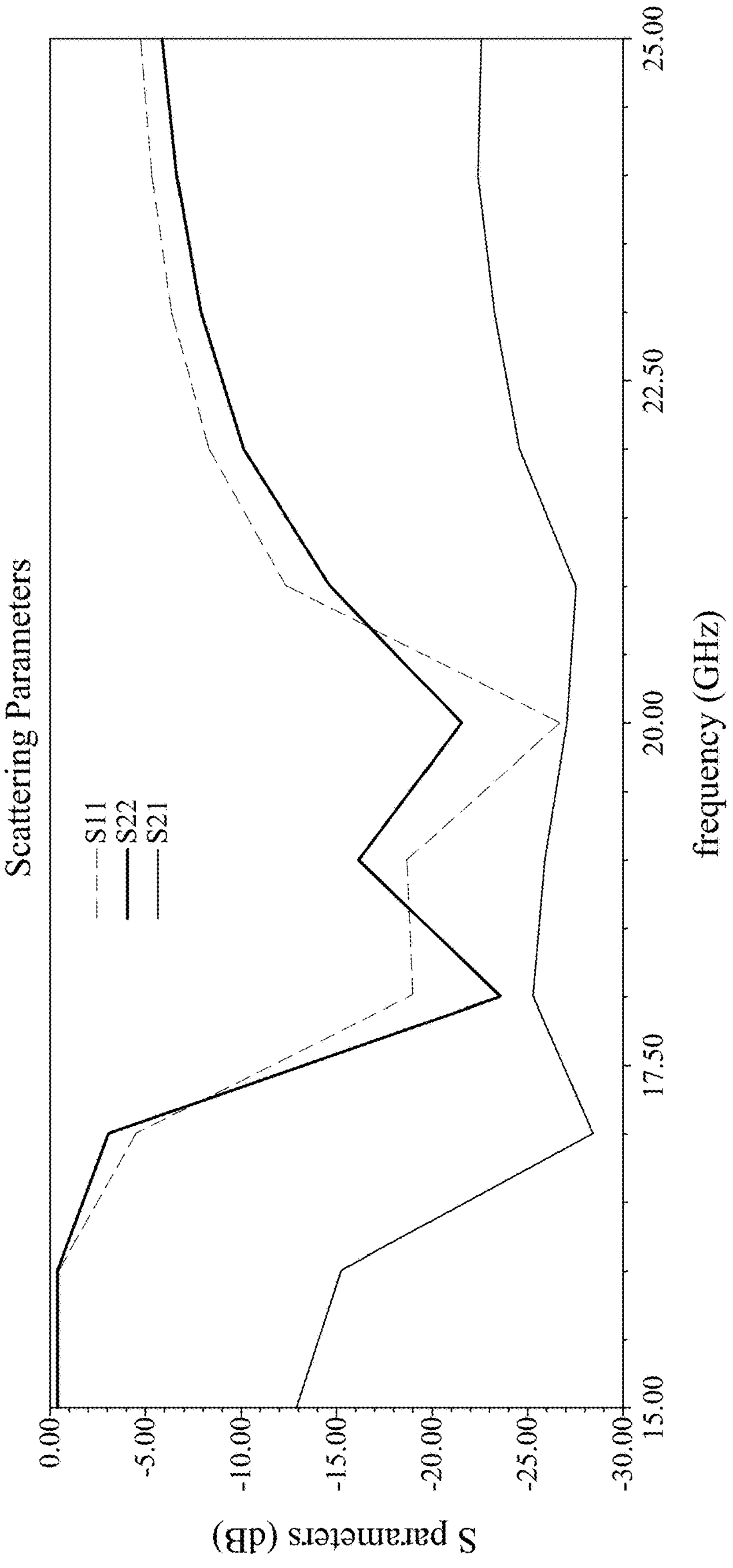
FIG. 6 is a plot illustrating various scattering parameters (S parameters) of the magneto-electric dipole antenna according to the embodiment.

FIG. 6 is a plot illustrating scattering parameters (S11, S22, and S21) of the magneto-electric dipole antenna of this embodiment in a frequency range of 15 GHz to 25 GHz. Referring to FIGS. 3 and 6, the scattering parameter (S11) is a reflection coefficient at the first feed-in line 51, and is smaller than a target value of the scattering parameter (S11) (e.g., −10 dB) in the operating frequency band of the magneto-electric dipole antenna. The scattering parameter (S22) is a reflection coefficient at the second feed-in line 52, and is smaller than a target value of the scattering parameter (S22) (e.g., −10 dB) in the operating frequency band of the magneto-electric dipole antenna. The scattering parameter (S21) is a transmission coefficient that is related to isolation between the first feed-in line 51 and the second feed-in line 52, and is smaller than a target value of the scattering parameter (S21) (e.g., −20 dB) in the operating frequency band of the magneto-electric dipole antenna.

Figure 7:
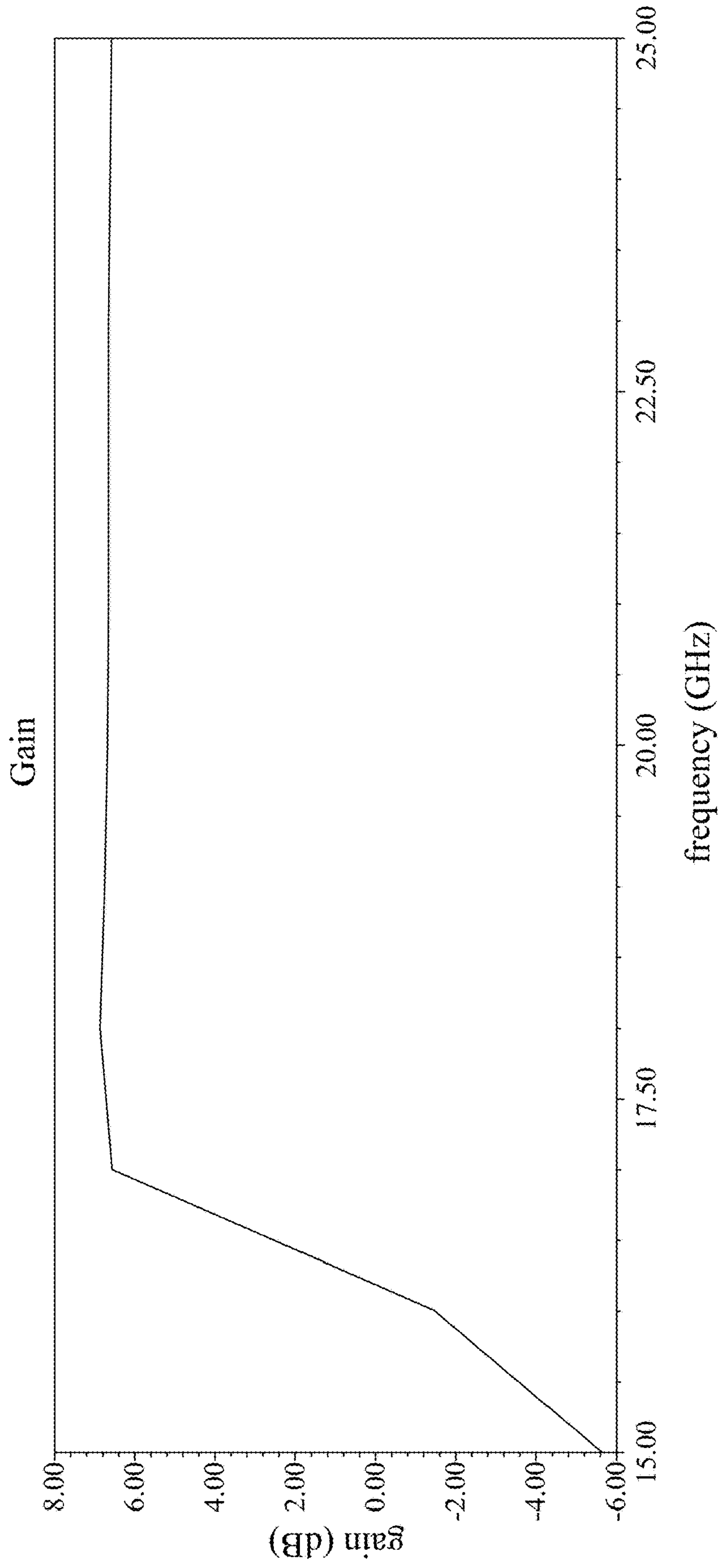
FIG. 7 is a plot illustrating a gain of the magneto-electric dipole antenna according to the embodiment.

FIG. 7 is a plot illustrating a gain of the magneto-electric dipole antenna of this embodiment in a frequency range of 15 GHz to 25 GHz. As shown in FIG. 7, the gain of the magneto-electric dipole antenna is greater than 6.6 dB in the operating frequency band (17.7 GHz to 21.2 GHz) of the magneto-electric dipole antenna.

Figure 8:
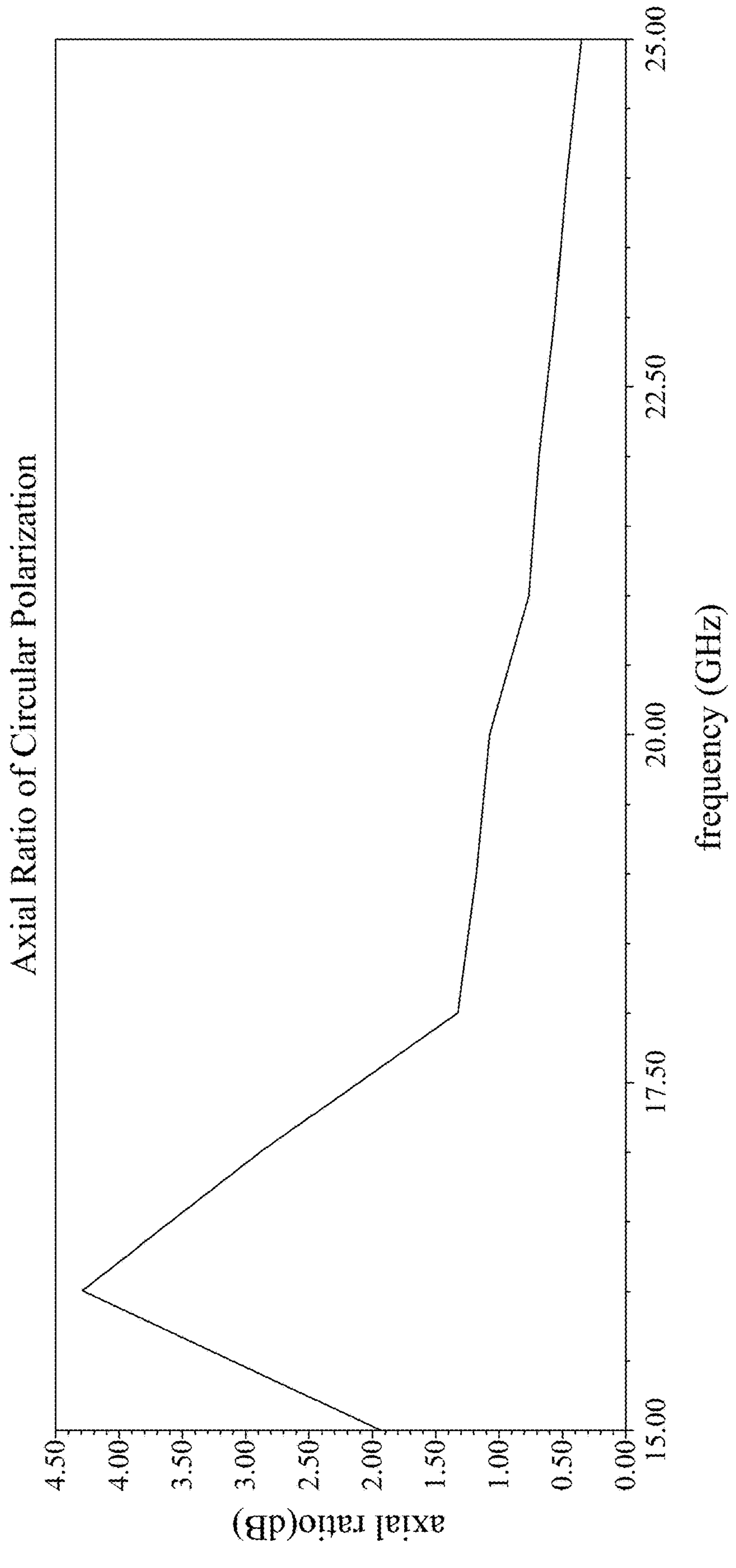
FIG. 8 is a plot illustrating an axial ratio of circular polarization of the magneto-electric dipole antenna according to the embodiment.

FIG. 8 is a plot illustrating an axial ratio of circular polarization of the magneto-electric dipole antenna of this embodiment in a frequency range of 15 GHz to 25 GHz. As shown in FIG. 8, the axial ratio of this embodiment is smaller than 1.5 dB in the operating frequency band of the magneto-electric dipole antenna.

Figure 9:
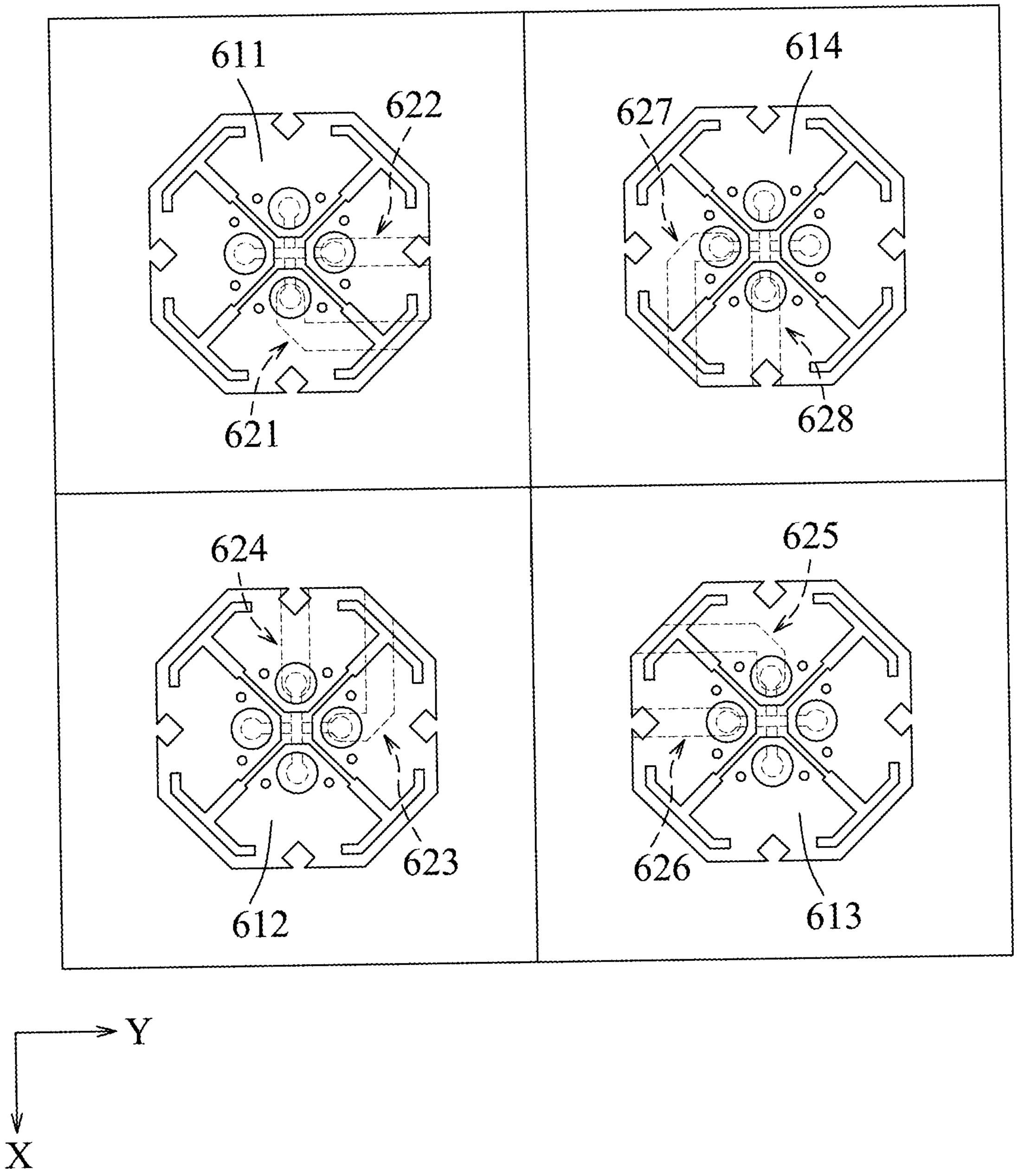
FIG. 9 is a top view illustrating an antenna array according to another embodiment of the disclosure.

Referring to FIG. 9, an antenna array according to an embodiment of the disclosure includes a first antenna 611, a second antenna 612, a third antenna 613 and a fourth antenna 614, each of which includes the magneto-electric dipole antenna as mentioned above.

The first antenna 611 includes a first input port 621 and a second input port 622 (respectively corresponding to the first feed-in line 51 and the second feed-in line 52 (see FIG. 3) of the magneto-electric dipole antenna of the first antenna 611); the second antenna 612 includes a third input port 623 and a fourth input port 624 (respectively corresponding to the first feed-in line 51 and the second feed-in line 52 (see FIG. 3) of the magneto-electric dipole antenna of the second antenna 612); the third antenna 613 includes a fifth input port 625 and a sixth input port 626 (respectively corresponding to the first feed-in line 51 and the second feed-in line 52 (see FIG. 3) of the magneto-electric dipole antenna of the third antenna 613); and the fourth antenna 614 includes a seventh input port 627 and an eighth input port 628 (respectively corresponding to the first feed-in line 51 and the second feed-in line 52 (see FIG. 3) of the magneto-electric dipole antenna of the fourth antenna 614).

A center of the second antenna 612 is aligned with a center of the first antenna 611 in the second direction (X), and the second antenna 612 is offset from the first antenna 611 in the counterclockwise direction by 90 degrees. A center of the third antenna 613 is aligned with the center of the second antenna 612 in the third direction (Y), and the third antenna 613 is offset from the second antenna 612 in the counterclockwise direction by 90 degrees. A center of the fourth antenna 614 is aligned with the center of the third antenna 613 in the second direction (X), and the fourth antenna 614 is offset from the third antenna 613 in the counterclockwise direction by 90 degrees.

In this embodiment, the antenna array is configured to operate in the frequency band from 17.7 GHz to 21.2 GHz (i.e., an operating frequency band of the antenna array is from 17.7 GHz to 21.2 GHz), and can be used in a low-earth orbit satellite communication system.

Figure 10:
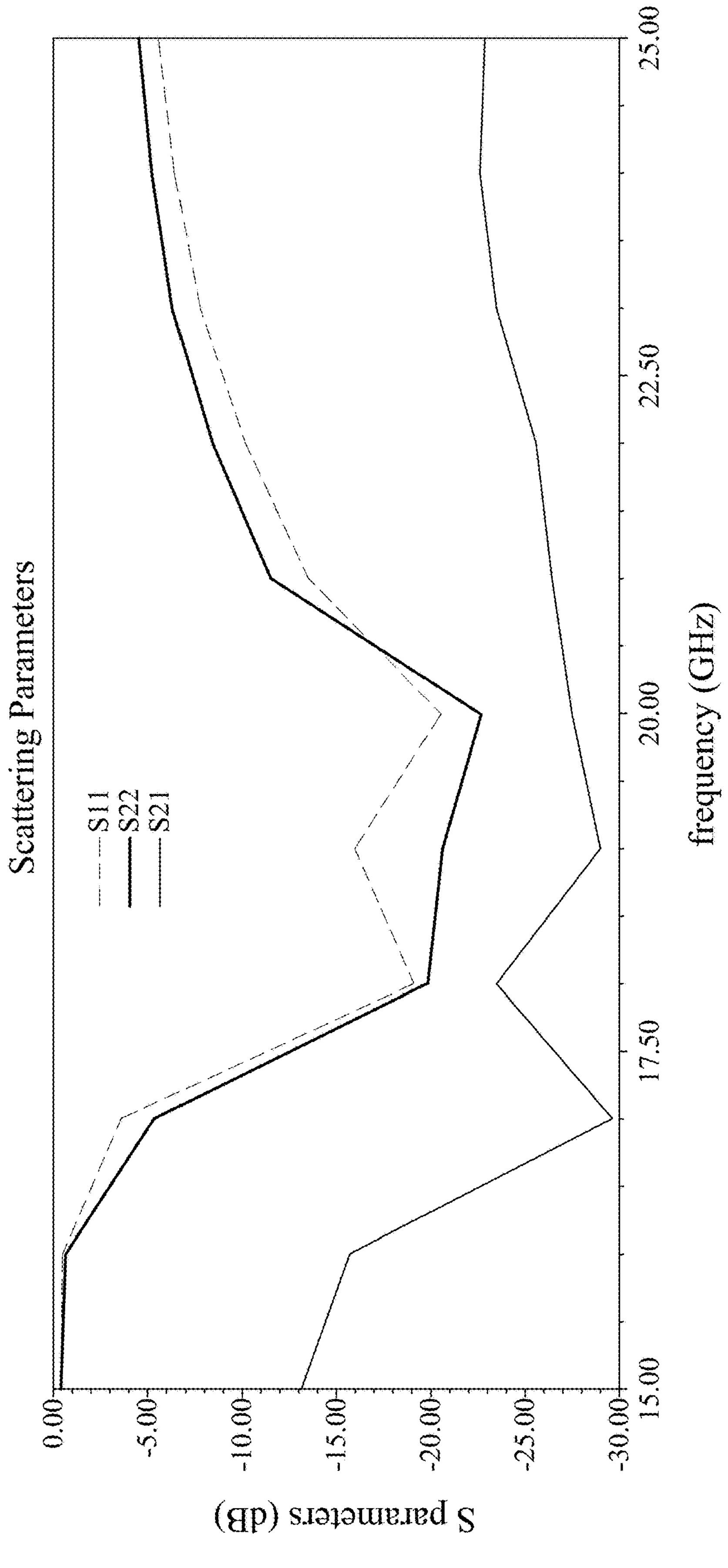
FIG. 10 is a plot illustrating various scattering parameters (S parameters) of the antenna array according to the another embodiment.

FIG. 10 is a plot illustrating scattering parameters (S11, S22, and S21) of each of the antennas 611-614 of the antenna array (see FIG. 9) of this embodiment in a frequency range of 15 GHz to 25 GHz.

Referring to FIGS. 3, 9 and 10, for each of the antennas 611-614, the scattering parameter (S11) is a reflection coefficient at the input port of the antenna that corresponds to the first feed-in line 51 (e.g., the first input port 621 of the first antenna 611), and is smaller than a target value of the scattering parameter (S11) (e.g., −10 dB) in the operating frequency band of the antenna array. The scattering parameter (S22) is a reflection coefficient at the input port of the antenna that corresponds to the second feed-in line 52 (e.g., the second input port 622 of the first antenna 611), and is smaller than a target value of the scattering parameter (S22) (e.g., −10 dB) in the operating frequency band of the antenna array. The scattering parameter (S21) is a transmission coefficient that is related to isolation between the input ports of the antenna that correspond respectively to the first feed-in line 51 and the second feed-in line 52 (e.g., the first input port 621 and the second input port 622 of the first antenna 611), and is smaller than a target value of the scattering parameter (S21) (e.g., −20 dB) in the operating frequency band of the antenna array.

Figure 11:
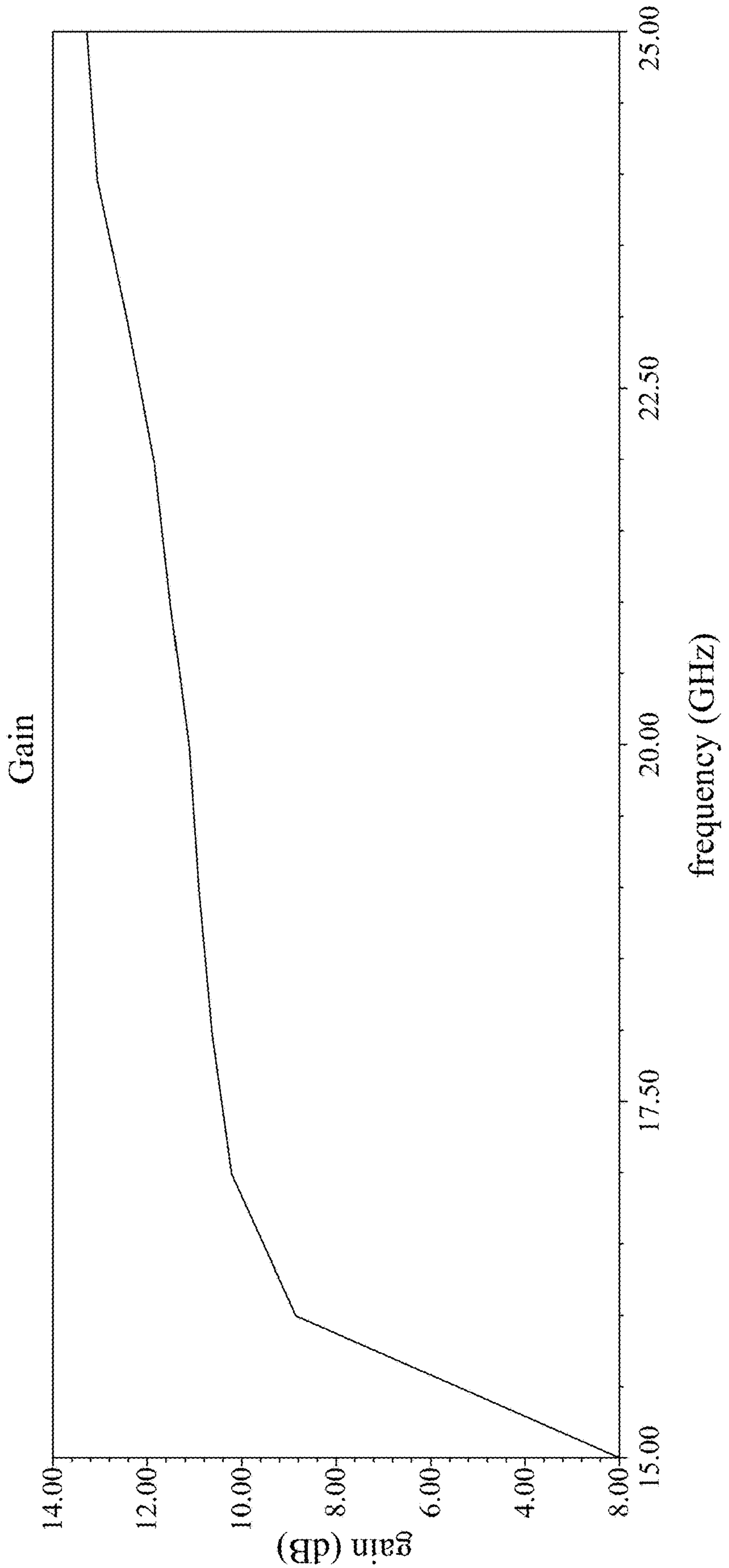
FIG. 11 is a plot illustrating a gain of the antenna array according to the another embodiment.

FIG. 11 is a plot illustrating a gain of the antenna array (see FIG. 9) of this embodiment in a frequency range of 15 GHz to 25 GHz. As shown in FIG. 11, the gain of the antenna array is greater than 10 dB in the operating frequency band of the antenna array.

Figure 12:
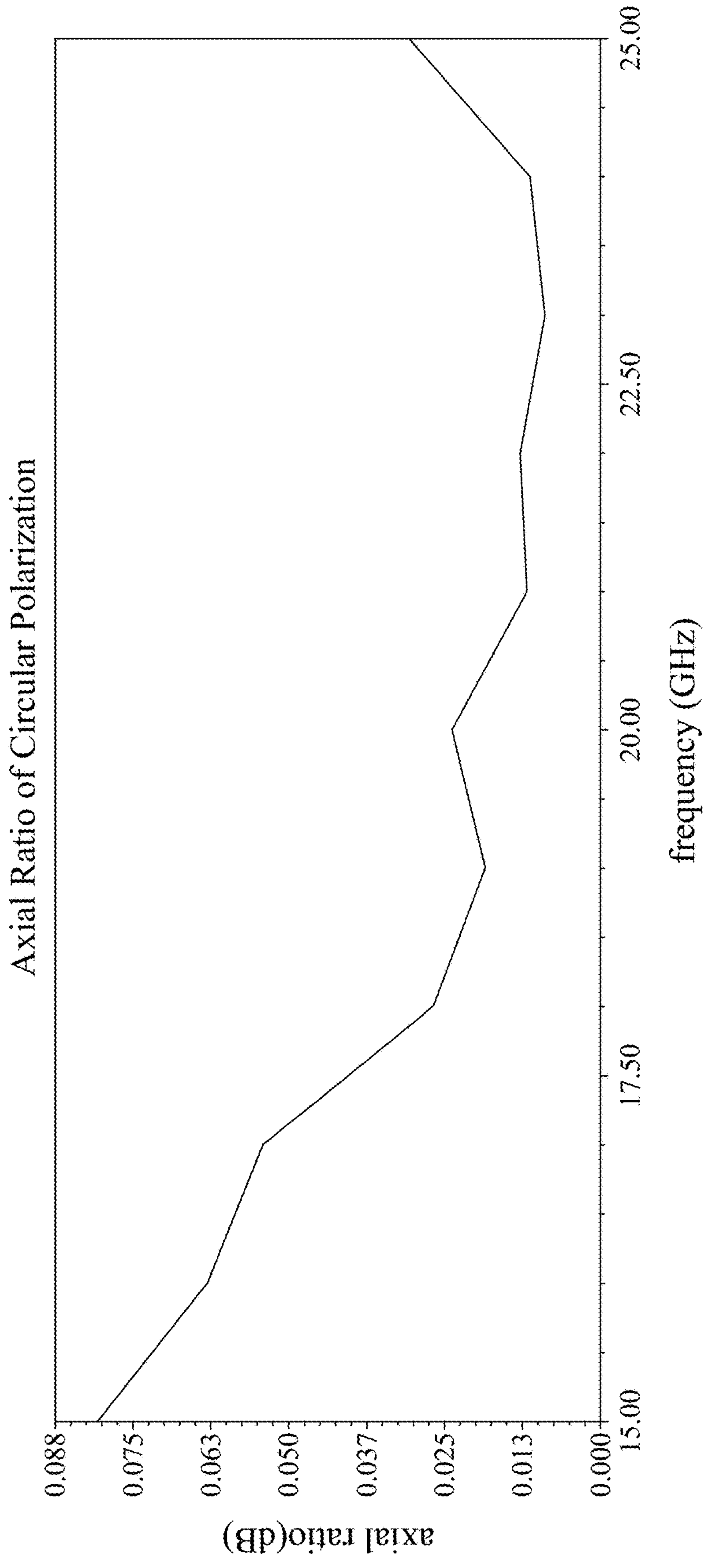
FIG. 12 is a plot illustrating an axial ratio of circular polarization of the antenna array according to the another embodiment.

FIG. 12 is a plot illustrating an axial ratio of circular polarization of the antenna array (see FIG. 9) of this embodiment in a frequency range of 15 GHz to 25 GHz. As shown in FIG. 12, the axial ratio of this embodiment is smaller than 0.03 dB in the operating frequency band of the antenna array.

Referring back to FIGS. 3 and 9, in summary, according to the disclosure, when the radiative element 2 receives the input electromagnetic wave, a portion of the input electromagnetic wave is sequentially and electromagnetically coupled to the first feeding probe 41 and the first feed-in line 51, and another portion of the input electromagnetic wave is sequentially and electromagnetically coupled to the second feeding probe 42 and the second feed-in line 52, thus achieving the function of signal transmission using the magneto-electric dipole antenna. Moreover, multiple magneto-electric dipole antennas may be combined to form the antenna array, while the effect of circular polarization can be obtained without obvious cracking of the scattering parameters in the operating frequency band of the antenna array.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A magneto-electric dipole antenna comprising:

a substrate module including an upper surface and a lower surface;

a radiative element disposed on said upper surface of said substrate module;

a first feeding probe and a second feeding probe that are disposed in said substrate module and below said radiative element, where a length of said second feeding probe extending in a first direction pointing from top to bottom is greater than a length of said first feeding probe extending in the first direction;

a first feed-in line and a second feed-in line that are disposed on said lower surface of said substrate module, said first feeding probe being electrically connected to said first feed-in line, and said second feeding probe being electrically connected to said second feed-in line; and a plurality of conducting rods extending from said radiative element in the first direction and penetrating said substrate module, wherein each of said conducting rods serves as a magnetic dipole of the magneto-electric dipole antenna, and said radiative element serves as an electric dipole of the magneto-electric dipole antenna, wherein in response to said radiative element receiving an input electromagnetic wave, a portion of the input electromagnetic wave is sequentially and electromagnetically coupled to said first feeding probe and said first feed-in line, and another portion of the input electromagnetic wave is sequentially and electromagnetically coupled to said second feeding probe and said second feed-in line, wherein said first feeding probe is disposed entirely below said radiative element and includes:

a first connecting component that is disposed in said substrate module, and that has a first primary end and a first auxiliary end which are opposite to each other and are aligned in a line parallel to a second direction, a first primary rod that extends in the first direction from said first primary end to a first plane flush with said lower surface of said substrate module, and a first auxiliary rod that extends in the first direction from said first auxiliary end to a second plane higher than said lower surface of said substrate module, where a length of said first auxiliary rod is shorter than a length of said first primary rod, wherein said second feeding probe is disposed entirely below said radiative element and includes a second connecting component that is disposed in said substrate module, and that has a second primary end and a second auxiliary end which are opposite to each other and are aligned in a line parallel to a third direction, a second primary rod that extends in the first direction from said second primary end to the first plane flush with said lower surface of said substrate module, and a second auxiliary rod that extends in the first direction from said second auxiliary end to a third plane higher than said lower surface of said substrate module, where a length of said second auxiliary rod is shorter than a length of said second primary rod, wherein said radiative element includes a first main part, a second main part, a third main part and a fourth main part which are arranged around a center of said upper surface of said substrate module, and each of which is provided with a first hole and a second hole, wherein said first primary rod of said first feeding probe is entirely within a projection of said first hole of said first main part in the first direction, wherein said first auxiliary rod of said first feeding probe is entirely within a projection of said first hole of said third main part in the first direction, wherein said second primary rod of said second feeding probe is entirely within a projection of said first hole of said second main part in the first direction, and wherein said second auxiliary rod of said second feeding probe is entirely within a projection of said first hole of said fourth main part in the first direction.

2. The magneto-electric dipole antenna as claimed in claim 1, wherein:

said second connecting component is closer to said radiative element than said first connecting component;

the length of said second primary rod is greater than the length of said first primary rod;

a center of said first connecting component, a center of said second connecting component and the center of said upper surface of said substrate module are aligned in a line parallel to the first direction; and said first feeding probe and said second feeding probe are spaced apart from each other.

3. The magneto-electric dipole antenna as claimed in claim 1, wherein:

said first feed-in line extends, in the second direction, from an end portion of said first primary rod that is close to said lower surface of said substrate module away from said first auxiliary rod; and said second feed-in line extends, in the third direction, from an end portion of said second primary rod that is close to said lower surface of said substrate module away from said second auxiliary rod.

4. The magneto-electric dipole antenna as claimed in claim 1, wherein said radiative element is a plate with a shape of a polygon, where a number of sides of the polygon is an integer greater than four.

5. The magneto-electric dipole antenna as claimed in claim 4, wherein:

said radiative element is octagonal, and further includes four connecting parts;

said first main part and said third main part are disposed to have mirror symmetry about a line that passes through the center of said upper surface of said substrate module along the second direction, said second main part and said fourth main part are disposed to have mirror symmetry about a line that passes through the center of said upper surface of said substrate module along the third direction, and any adjacent two of said first main part, said second main part, said third main part, and said fourth main part are electrically connected to each other through one of said connecting parts;

each one of said first main part, said second main part, said third main part, and said fourth main part has mirror symmetry about a line that passes through a center of said first hole and a center of said second hole; and said first main part, said second main part, said third main part, said fourth main part, and said connecting parts cooperatively form a separation slot.

6. The magneto-electric dipole antenna as claimed in claim 5, wherein:

said first main part, said second main part, said third main part, and said fourth main part are disposed separately from each other;

said second main part is offset from said first main part in a counterclockwise direction by 90 degrees;

said third main part is offset from said second main part in the counterclockwise direction by 90 degrees; and said fourth main part is offset from said third main part in the counterclockwise direction by 90 degrees.

7. An antenna array, comprising:

a first antenna, a second antenna, a third antenna and a fourth antenna, each including said magneto-electric dipole antenna as claimed in claim 1;

wherein a center of said second antenna is aligned with a center of said first antenna in an X direction, and said second antenna is offset from said first antenna in a counterclockwise direction by 90 degrees;

wherein a center of said third antenna is aligned with the center of said second antenna in a Y-direction, and said third antenna is offset from said second antenna in the counterclockwise direction by 90 degrees; and wherein a center of said fourth antenna is aligned with the center of said third antenna in the X-direction, and said fourth antenna is offset from said third antenna in the counterclockwise direction by 90 degrees.

* * * * *